United States Patent
Jacob et al.

(10) Patent No.: US 6,846,877 B2
(45) Date of Patent: Jan. 25, 2005

(54) BLENDS OF OLEFINIC THERMOPLASTIC VULCANIZATE WITH HIGH IMPACT POLYSTYRENE

(75) Inventors: Sunny Jacob, Akron, OH (US); Kathleen Perevosnik, Akron, OH (US); Joseph E. Pfeiffer, Akron, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 112 days.

(21) Appl. No.: 10/329,594

(22) Filed: Dec. 26, 2002

(65) Prior Publication Data

US 2004/0127644 A1 Jul. 1, 2004

(51) Int. Cl.⁷ .............................................. C08L 53/00
(52) U.S. Cl. ............................. 525/88; 525/89; 525/95; 525/99
(58) Field of Search .............................. 525/88, 89, 95, 525/99

(56) References Cited

U.S. PATENT DOCUMENTS

| 3,037,954 A | 6/1962 | Gessler et al. | |
| 6,598,637 B2 * | 7/2003 | Lechtenböhmer et al. | .. 152/450 |
| 2003/0083434 A1 * | 5/2003 | Ouhadi et al. | ................ 525/80 |

FOREIGN PATENT DOCUMENTS

WO    WO 01/55257    8/2001

* cited by examiner

Primary Examiner—James J. Seidleck
Assistant Examiner—Olga Asinovsky
(74) Attorney, Agent, or Firm—William A. Skinner; William G. Muller

(57) ABSTRACT

An olefinic thermoplastic vulcanizate is blended with a rubber-modified monovinylidene aromatic monomer, utilizing a flexible block copolymer as compatabilizing agent. The resulting composition demonstrates improved miscibility and bonding characteristics and increased hardness not previously achievable using unmodified thermoplastic vulcanizates.

16 Claims, No Drawings

BLENDS OF OLEFINIC THERMOPLASTIC VULCANIZATE WITH HIGH IMPACT POLYSTYRENE

BACKGROUND OF THE INVENTION

1. Field of the Invention

The invention is directed to blends of olefinic thermoplastic vulcanizates with high impact polystyrene utilizing a flexible block copolymer as compatabilizer.

2. Description of the Prior Art

Blends which have combination of both thermoplastic and elastic properties are generally obtained by combining a thermoplastic resin with an elastomeric material in a way such that the elastomer is intimately and uniformly dispersed as a discrete particulate phase within a continuous phase of the thermoplastic. Early work with the vulcanization of the elastomer phase is found in U.S. Pat. No. 3,037,954 which discloses static vulcanization, as well as dynamic vulcanization wherein a vulcanizable elastomer is dispersed into a resinous thermoplastic polymer and the elastomer is cured (crosslinked) while continuously mixing and shearing the blend.

In International Patent App. No. PCT/US01/02482, there is described a thermoplastic elastomer which has been modified by the addition of a vinyl aromatic block copolymer. The compositions of the invention have improved adhesive properties with respect to polymeric substrates, particularly with respect to engineering thermoplastics.

However, previous attempts at blending of thermoplastic vulcanizates with a rubber-modified monovinylidene aromatic polymeric component, specifically high impact polystyrene, have been unsuccessful.

SUMMARY OF THE INVENTION

In accordance with the present invention, a thermoplastic vulcanizate formed from polyolefins and a rubbery thermoplastic copolymer is blended with a rubber-modified monovinylidene aromatic monomer, more specifically high impact polystyrene, utilizing a flexible block copolymer as a compatabilizer, thereby providing a thermoplastic elastomer composition having improved bonding to polar substrates and increased hardness not previously achievable using unmodified thermoplastic vulcanizates.

DETAILED DESCRIPTION OF THE INVENTION

Polyolefins suitable for use in the compositions of the invention include thermoplastic, crystalline polyolefin homopolymers and copolymers. They are desirably prepared from monoolefin monomers having from 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferred, however, are monomers having 3 to 6 carbon atoms, with propylene being most preferred. As used in the specification and claims, the term polypropylene includes homopolymers of propylene as well as reactor and/or random copolymers of propylene which can contain about 1 to about 30 weight percent of ethylene and/or an α-olefin comonomer of 4 to 16 carbon atoms, and mixtures thereof. The polypropylene can have different types of crystalline structure such as isotactic or syndiotactic, and different degrees of crystallinity including materials with a high percentage of amorphous structure such as the "elastic" polypropylenes. Further polyolefins which can be used in the invention are high, low, linear-low and very low density polyethylenes, and copolymers of ethylene with (meth) acrylates and/or vinyl acetates.

The polyolefins mentioned above can be made using conventional Ziegler/Natta catalyst systems or by single site catalyst systems. Commercially available polyolefins may be used in the practice of the invention.

The amount of thermoplastic polyolefin found to provide useful thermoplastic elastomer compositions is generally from about 8 to about 90 weight percent, with the proviso that the total amount of polyolefin and olefinic rubber is at least about 35 weight percent based on the total weight of the thermoplastic polyolefin, olefin rubber and optional additives. Preferably, the thermoplastic polyolefin content will range from about 10 percent to about 60 percent by weight, based on the total weight of the composition.

Suitable monoolefin copolymer rubbers include non-polar, rubbery copolymers of two or more α-olefins, preferably copolymerized with at least one polyene, usually a diene. Saturated monoolefin copolymer rubber, for example polyethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); and vinyl norbornene (VNB).

Butyl rubbers are also useful in the thermoplastic elastomer compositions. As used in the specification and claims, the term butyl rubber includes copolymers of an isoolefin and a conjugated monoolefin, terpolymers of an isoolefin with or without a conjugated monoolefin, divinyl aromatic monomers and the halogenated derivatives of such copolymers and terpolymers. Another suitable copolymer within the scope of the olefin rubber of the present invention is a copolymer of a $C_4$–$C_7$ isomonoolefin and a para-alkylstyrene, and preferably a halogenated derivative thereof. The amount of halogen in the copolymer, predominantly in the para-alkylstyrene, is from about 0.1 to about 10 weight percent. A preferred example is the brominated copolymer of isobutylene and para-methylstyrene. Natural rubbers are also olefin rubbers suitable for use in the thermoplastic elastomer composition.

The amount of olefin rubber in the thermoplastic elastomer generally ranges from about 70 to about 10 weight percent, with the proviso that the total amount of thermoplastic polyolefin and olefin rubber is at least about 35 weight percent, based on the weight of the polyolefin, rubber and optional additives. Preferably the olefin rubber content will be in the range of from about 50 to about 10 weight percent, based on the total weight of the composition.

The thermoplastic elastomer may optionally include various conventional additives such as reinforcing and non-reinforcing fillers, antioxidants, stabilizers, rubber processing oils, extender oils, lubricants, antiblocking agents, antistatic agents, waxes, foaming agents, pigments, flame retardants, and other processing aids known in the rubber compounding art. Such additives may comprise up to about 65 weight percent, more preferably up to about 50 weight percent, of the total composition. Fillers and extenders which can be utilized include conventional inorganics such as calcium carbonate, clays, silica, talc, titanium dioxide, carbon black and the like. The rubber processing oils generally are paraffinic, napthenic or aromatic oils derived from petroleum fractions. The oils are selected from those ordinarily used in conjunction with the specific rubber or rubber component present in the composition.

The composition of the invention includes a rubber-modified monovinylidene monomer, and more specifically, high impact polystyrene. High impact polystyrene is commercially available and is well known to the literature as well as to the art. High impact polystyrene (HIPS) is produced from monovinylidene aromatic styrene monomers along with elastomeric polymer materials and is generally available in various impact-strength grades. HIPS is generally produced by introducing elastomers such as polybutadiene into a polystyrene matrix for impact modification and can be produced by either a suspension process, or more preferably, by a mass continuous polymerization process.

As examples of the elastomeric polymer materials which are suitable for incorporation into the polystyrene for impact resistance include, natural rubber and, in most instances, synthetic rubber may also be utilized. The synthetic rubbers are polymers of conjugated dienes containing from 4 to 6 carbon atoms, and thus include 1,3-alkadiene homopolymers and copolymers containing, in polymerized form and on an elastomeric polymer weight basis from about 60 to about 100 percent of a 1,3-alkadiene monomer, more particularly polymers of 1,3-butadiene, isoprene, or 2,3-dimethyl-1,3-butadiene, and from about 0 to about 40 weight percent of one or more monoethylenically unsaturated comonomers such as styrene, acrylonitrile, α-methylstyrene, methacrylonitrile, methyl methacrylate, ethyl acrylate, and the like. The relative proportion of rubber in the polystyrene may be varied over wide limits, with up to about 15% rubber content. Particularly preferred elastomeric polymer substrates for use herein are 1,3-alkadiene/monovinylidene aromatic (e.g., 1,3-butadiene/styrene) block copolymer rubbers which contain from about 60 to about 85 weight percent of the 1,3-alkadiene monomer block copolymerized with from about 15 to about 40 weight percent of one or more monovinylidene aromatic monomers.

Monovinylidene aromatic monomers suitable for use herein include those corresponding to the formula X—Ar wherein X is hydrogen or an alkyl radical containing from 1 to 3 carbon atoms and wherein Ar is phenyl, alkylphenyl, halophenyl or alkylhalophenyl. Examples of such monomers can include styrene, alpha-methylstyrene, alpha-ethylstyrene, vinyl toluene, alpha-methylvinyltoluene, o- and p-ethylstyrene, 2,4-dimethylstyrene, o-bromostyrene, p-chlorostyrene, 2,4-dichlorostyrene and the like. Styrene itself is especially preferred on the basis of its cost and ready availability.

The amount of HIPS present in the thermoplastic blend of the invention is generally from about 2.5 weight percent to about 45 weight percent, preferably from about 7.5 to about 15 weight percent, and desirably from about 9 to about 11 weight percent based on the total weight of the formulation.

An important component of the composition of the invention is a flexible block copolymer, which serves as a compatabilizer and processing aid for the thermoplastic vulcanizate and HIPS. Heretofore, thermoplastic vulcanizate compositions blended with a rubber-modified polystyrene component generally formed an immiscible blend. It has now unexpectedly been found that when a compatabilizer is added to the composition during mixing, substantial improvement in miscibility results, while maintaining or improving bonding and hardness characteristics of the unmodified thermoplastic vulcanizate.

The flexible block copolymer is comprised of a block copolymer containing rigid blocks of vinyl aromatic monomers (S) and statistical non-rigid mid-blocks of diene/vinyl aromatic monomers (B/S). These block copolymers contain at least the block structure S-B/S-S. The glass transition temperature ($T_g$) of block S is generally above 25° C. and that of the block B/S is generally below 25° C. The B/S block is composed of about 75 to 30 weight percent vinyl aromatic monomer and about 25 to 70 weight percent diene monomer. Particularly preferred flexible B/S blocks have a vinyl aromatic monomer content of about 60 to 40 weight percent and a diene monomer content of about 40 to 60 weight percent. With respect to the total block copolymer component the diene content is less than about 40 weight percent, preferably about 35 weight percent, and the portion of the non-rigid B/S blocks amounts to at least about 50 weight percent, preferably about 70 weight percent. The block copolymer component has a low modulus and yield strength, with high elongation.

Suitable vinyl aromatic monomers include styrene, alkyl-substituted styrenes such as p-methylstyrene, vinyltoluene, as well as mixtures of said monomers. The preferred monomer is styrene. Suitable diene monomers include 1,3-butadiene, isoprene, piperylene, phenylbutadiene, and mixtures of said monomers. The preferred monomer is 1,3-butadiene. The conjugated diene monomer can also be fully or partially hydrogenated.

The block copolymers useful in the thermoplastic elastomer compositions of the invention are known in the art, and are further described in Canadian Pat. No. 2,193,264 and in International Pat. Applications WO 96/20248; WO 96/23823; WO 98/12240; and WO 99/46330. They are generally prepared by butyl lithium initiated sequential anionic polymerization, but coupling of living S-B/S diblocks or bifunctional initiation are also known methods.

The amount of the block copolymer component in the composition of the invention generally ranges from about 10 to about 35 weight percent, based on the total weight of the composition including the thermoplastic elastomer component, additives, and flexible block copolymer component. The preferred amount of flexible block copolymer ranges from about 15 to about 35 weight percent, with about 25 to about 31 weight percent being most preferred.

The olefin rubber component of the olefinic thermoplastic elastomer is generally present as small, i.e., micro size, particles within a continuous polyolefin matrix, although a co-continuous morphology or a phase inversion is also possible depending upon the amount of rubber relative to thermoplastic resin and the degree of vulcanization, if any, of the rubber. Preferably, the rubber is at least partially vulcanized, and most preferably it is fully vulcanized (crosslinked).

The partial or full crosslinking can be achieved by adding an appropriate rubber curative to the blend of thermoplastic olefin polymer and olefin rubber, and vulcanizing the rubber to the desired degree under vulcanizing conditions. Dynamic vulcanization means a vulcanization or crosslinking (curing) process wherein the rubber is vulcanized under conditions of shear at a temperature above the melting point of the polyolefin component. It is preferred that the rubber be crosslinked by the process of dynamic vulcanization. As used in the specification and claims, the terms "fully vulcanized" and "completely vulcanized" means that the rubber component to be vulcanized has been cured to a state in which the elastomeric properties of the cross-linked rubber are similar to those of the rubber in its conventional vulcanized state, apart from the thermoplastic vulcanizate composition, or as indicated by no more change in tensile strength. The degree of cure can be described in terms of gel content or, conversely, extractable components. Alternatively, the degree of cure may be expressed in terms of cross-link density. All of these descriptions are well known in the art, for example, in U.S. Pat. Nos. 5,100,947 and 5,157,081, both of which are fully incorporated herein by reference.

Partial or preferably complete cross-linking can be achieved by adding one or more of the appropriate quantities and types of vulcanizing agents under the conditions required to achieve the desired vulcanization as are known to those skilled in the art. Any known crosslinking system can be used, so long as it is suitable under the vulcanization conditions for the elastomer component and it is compatible with the thermoplastic olefin polymer component of the composition. Crosslinking (curing) agents include sulfur, sulfur donors, metal oxides, phenolic resin systems, maleimides, peroxide based systems, hydrosilylation systems, high energy radiation and the like, both with and without accelerators and co-agents.

Usually about 5 to about 20 parts by weight of the crosslinking agent or system are used per 100 parts by weight of the rubber component to be vulcanized.

The following general procedure was used in the preparation of the blend of the present invention as set forth in the examples of Table 1. The compositions were prepared in a typical thermoplastic compounding twin screw extruder, although other conventional mixing devices such as Banbury mixers, Farrel continuous mixers and the like are also satisfactory. The pellets of block copolymer were preblended with the thermoplastic elastomer component, HIPS and calcium carbonate, and the blend was added to the extruder using a loss-in-weight belt feeder. Alternatively, ingredients can be mixed by continuous addition or one pass methods.

The extrusion was set up to reach a melt temperature of at least about 180° C. but not higher than about 220° C. One extruder vent was used as a vacuum port to remove trace volatiles and to prevent porosity in the extruded composition. The compositions were finished into spherical pellets using an underwater pelletizer. After pelletizing, the compositions were molded into plaques for the determination of physical properties or were molded as described below for use in the peel test.

The compositions of the invention are rubbery materials having a Shore A hardness of between about 55 and about 75 and improved bonding to polar substrates. The thermoplastic vulcanizate compositions of the present invention are preferably utilized in applications requiring a hard substrate with a soft feel, including golf club grips, razor and tool handles, cell phones, storage container lids, household appliances, and the like.

The following measurement methods were used in evaluating the examples of the invention:
 Shore Hardness—ASTM D2240
 Specific Gravity—ASTM D792
 Adhesion—ASTM D1876

Adhesion of the compositions of the invention was measured by a peel test modified after ASTM D1876, with the modification that a hard and soft substrate was used in place of two soft substrates. Also, since adhesion is obtained at the substrate interface due to the inventive composition, no separate adhesive layer exists. For evaluation of insert molding conditions the harder thermoplastic substrates were produced in an "L" shaped mold cavity, then were removed and allowed to cool to ambient temperature. The shaped plastic profile was then inserted into another mold with a "T" shaped cavity, so as to take up one-half of the cavity. The molten composition of the invention was then injection molded onto the existing "L" to produce a "T-bar" article. For evaluation of compression molding conditions the thermoplastic "L" is produced as described, but is not removed from the mold. By either rotating the mold cavity to the next station or by using a sliding core plate, the molded "L" is immediately made accessible in a "T" cavity and the molten composition of the invention is injected. A standard tensiometer was then used to measure peel values for the "T-bars", by placing each tab of the upper "T" in separate grips. The grips were then pulled apart at 180 degrees. The force to peel was plotted against the crosshead travel which is also the peel length down the profile. The curve typically reached a peak and then descended to a plateau. The plateau values were recorded as the adhesion, expressed as pounds per linear inch (pli).

In addition, it was necessary to develop a method for evaluation of the adhesion of small scale samples. This method was also modified after ASTM D1876. The harder thermoplastic substrates were produced as individual plaques of 0.065" thick via injection molding. These sheets were allowed to cool to ambient temperature and were then cut to 2.5" by 5.0". The pieces were then placed in a Teflon coated mold with approximately 1" at one end being covered by a heat resistant tape. The composition of the invention was added to the top of the substrates as small compression molded pieces. The mold was placed into a compression molding machine wherein the substrate platen was at 250 F and the material of the invention platen was at 420 F. The mold was heated for 5 minutes, and cooled for 12 minutes. During this process the platen pressure remained at 12 tons. After demolding, the taped end of the substrate was heated gently so that it could be bent into an "L" for the "T-bar". The material of the invention remained flexible enough that it could be placed in the tensiometer and tested as in the above method. Again, the plateau values were recorded as the adhesion, expressed as pounds per linear inch (pli).

The properties of compositions of the invention and their adhesion to substrates such as acrylonitrile/butadiene/styrene (ABS), polycarbonate (PC), PC/ABS alloys and polystyrene (PS) are set forth in Table 1.

Abbreviations and product names used in the table are defined as follows:
 8211-45—Santoprene® thermoplastic elastomer based on polypropylene and vulcanized EPDM (Advanced Elastomer Systems, L.P.)
 8211-55—Santoprene® thermoplastic elastomer based on polypropylene and vulcanized EPDM rubber (Advanced Elastomer Systems, L.P.)
 8211-65—Santoprene® thermoplastic elastomer based on polypropylene and vulcanized EPDM rubber (Advanced Elastomer Systems, L.P.)
 8211-75—Santoprene® thermoplastic elastomer based on polypropylene and vulcanized EPDM rubber (Advanced Elastomer Systems, L.P.)
 Styroflex® 2G66—Flexible styrene-butadiene block copolymer (BASF Aktiengesellschaft)
 Valtra HG350N2—High gloss, high impact styrenic copolymer (Chevron Phillips Chemical Co., LP)
 Cycolac® GPM 5600—reactor polymerized ABS (General Electric)

TABLE 1

| Component (wt. %) | Example No. | | | | | | | | |
|---|---|---|---|---|---|---|---|---|---|
|  | 1 | 2 | 3 | 4 | 5 | 6 | 7 | 8 | 9 |
| Styroflex 2G66 | 0 | 0 | 0 | 0 | 0.0 | 20.0 | 30.0 | 15.0 | 15.0 |
| Omyacarb FT |  |  |  |  | 5.0 | 13.0 | 13.0 | 13.0 | 13.0 |
| 8211-45 | 100 |  |  |  |  |  |  | 56.5 |  |
| 8211-55 |  | 100 |  |  |  |  |  |  |  |
| 8211-65 |  |  | 100 |  | 54.5 | 41.0 | 41.0 |  | 56.5 |
| 8211-75 |  |  |  | 100 |  |  |  |  |  |
| VALTRA HG350NO2 | 0 | 0 | 0 | 0 | 40.5 | 26.0 | 16.0 | 15.5 | 15.5 |
| total | 100 | 100 | 100 | 100 | 100 | 100 | 100 | 100 | 100 |
| Properties |  |  |  |  |  |  |  |  |  |
| Hardness, ISO A | 49 | 59 | 70 | 80 | incompatible | 77 | 73 | 59 | 69 |
| Specific gravity | 0.92 | 0.92 | 0.92 | 0.93 |  | 1.052 | 1.05 | 1.042 | 1.049 |
| Bonding to ABS, pli | 0 | 0 | 0 | 0 |  | 5 | 3.5 | 2.5 | 2 |

As can be seen from Table 1, the thermoplastic elastomer alone does not bond to planar substrates such as ABS, PC, PC/ABS alloys or PS. The addition of HIPS to the thermoplastic elastomer does not form a miscible blend. However, upon the addition of Styroflex 2G66 compatabilizer, the resultant blend will bond to the polar substrates. In addition, the resultant blends show increased hardness versus the unmodified thermoplastic elastomer. In all cases, the Omyacarb FT calcium carbonate was used to aid heat transfer for injection molding applications.

While in accordance with the Patent Statutes the best mode and preferred embodiment have been set forth, the scope of the invention is not limited thereto but rather by the scope of the claims.

What is claimed is:

1. A thermoplastic elastomer composition comprising a blend of:
   (a) from about 40 to about 58 weight percent of a thermoplastic vulcanizate comprising a thermoplastic olefin homopolymer or copolymer and olefin rubber;
   (b) from about 10 to about 35 weight percent of a block copolymer comprising rigid blocks of vinyl aromatic monomers and non-rigid blocks of dienes and vinyl aromatic monomers containing at least the block structure S-B/S-S, wherein the diene content is less than about 40 weight percent of the total block copolymer and the non-rigid blocks B/S amount to at least about 50 weight percent of the total block copolymer; and
   (c) from about 2.5 to about 45 weight percent of a monovinylidene aromatic monomer modified with an elastomeric polymer.

2. The thermoplastic elastomer composition of claim 1, wherein said monovinylidene aromatic monomer is one or more of styrene, α-methylstyrene, α-ethylstyrene, vinyl toluene, α-methylvinyltoluene, o- and p-ethylstyrene, 2,4-dimethylstyrene, o-bromostyrene, p-chlorostyrene, and 2,4-dichlorostyrene, and said elastomeric polymer is one or more of a natural rubber or a synthetic rubber of conjugated dienes containing from 4 to 6 carbon atoms.

3. The thermoplastic elastomer composition of claim 2, wherein said monovinylidene aromatic monomer is styrene, and said elastomeric polymer is polybutadiene.

4. The thermoplastic elastomer composition of claim 1, wherein said thermoplastic vulcanizate comprises a thermoplastic olefin polymer selected from the group consisting of polyethylene and polypropylene, and an olefin rubber selected from the group consisting of ethylene-propylene copolymer rubber and ethylene-propylene-nonconjugated diene terpolymer rubber.

5. The thermoplastic elastomer composition of claim 1, wherein said block copolymer comprises rigid blocks of styrene and non-rigid blocks of 1,3-butadiene and styrene.

6. The thermoplastic elastomer composition of claim 1, wherein said olefin rubber has been dynamically vulcanized.

7. An article comprising the thermoplastic elastomer composition of claim 1.

8. A method for preparing a thermoplastic elastomer composition comprising the step of blending at a melt temperature a thermoplastic vulcanizate comprising a thermoplastic olefin homopolymer or copolymer and olefin rubber with a rubber-modified monovinylidene aromatic polymeric component utilizing as a compatibilizer a block copolymer comprising rigid blocks of vinyl aromatic monomers and non-rigid blocks of dienes and vinyl aromatic monomers containing at least the block structure S-B/S-S, wherein the diene content is less than about 40 weight percent of the total block copolymer and the non-rigid blocks B/S amount to at least about 50 weight percent of the total block copolymer.

9. The method of claim 8, wherein said monovinylidene aromatic monomer is one or more of styrene, α-methylstyrene, α-ethylstyrene, vinyl toluene, α-methylvinyltoluene, o- and p-ethylstyrene, 2,4-dimethylstyrene, o-bromostyrene, p-chlorostyrene, and 2,4-dichlorostyrene, and said elastomeric polymer is one or more of a natural rubber or a synthetic rubber of conjugated dienes containing from 4 to 6 carbon atoms.

10. The method of claim 9, wherein said monovinylidene aromatic monomer is styrene, and said elastomeric polymer is polybutadiene.

11. The method of claim 8, wherein said thermoplastic elastomer comprises a blend of thermoplastic olefin homopolymer or copolymer and olefin rubber.

12. The method of claim 11, wherein said blend comprises a thermoplastic olefin polymer selected from the group consisting of polyethylene and polypropylene, and an olefin rubber selected from the group consisting of ethylene-propylene copolymer rubber and ethylene-propylene-nonconjugated diene terpolymer rubber.

13. The method of claim 8, wherein said block copolymer comprises rigid blocks of styrene and non-rigid blocks of 1,3-butadiene and styrene.

14. The method of claim 12, wherein the thermoplastic elastomer comprises a thermoplastic olefin matrix having dispersed therein discrete particles of olefin rubber which has been at least partially vulcanized by dynamic vulcanization.

15. An article comprising a thermoplastic elastomer composition prepared by the method of claim 8.

16. The method of claim 8 wherein said thermoplastic vulcanizate is blended in an amount of about 40 to about 58 wt. %, said rubber-modified monovinylidene aromatic polymeric component is blended in an amount of about 2.5 to about 45 wt. % and said block copolymer is blended in an amount of from about 10 to 35 wt. %, said weight percents based upon the total weight of the composition.

* * * * *